United States Patent

Goell

[15] 3,660,764

[45] May 2, 1972

[54] NON-COHERENT DIFFERENTIAL PHASE DETECTION

[72] Inventor: James E. Goell, Middletown, N.J.

[73] Assignee: Bell Telephone Laboratories, Incorporated, Murray Hill, N.J.

[22] Filed: Nov. 26, 1969

[21] Appl. No.: 879,994

[52] U.S. Cl. ....................................325/320, 178/66, 178/88

[51] Int. Cl. ........................................H04b 1/16, H041 27/22

[58] Field of Search .........................325/320, 60; 178/66, 88

[56] References Cited

UNITED STATES PATENTS

| | | | |
|---|---|---|---|
| 3,423,529 | 1/1969 | O'Neill | 178/88 |
| 3,456,193 | 7/1969 | Munoz | 325/60 |
| 3,518,680 | 6/1970 | McAuliffe | 325/60 |

*Primary Examiner*—Howard W. Britton
*Attorney*—R. J. Guenther and Arthur J. Torsiglieri

[57] ABSTRACT

A differentially phase modulated (DPM) information signal, such as a binary differentially coherent phase shift-keyed signal, is detected without the need for a synchronous local oscillator by decomposing the carrier information signal into its baseband conjugate in-phase and out-of-phase components, $I(t)$ and $Q(t)$, respectively, generating from the components the functions $F(t) = Q(t)I(t-T)-I(t)Q(t-T)$ and $G(t) = I(t)I(t-T)+Q(t)Q(t-T)$ and subsequently forming $H_1(t$ ½ $f,t)+G(t)$ tan $\alpha_1$, and $H_2(t) = F(t)+G(t)$ tan $\alpha_2$, where $T$ is the bit interval and $\alpha_1$ and $\alpha_2$ are arbitrary but generally unequal. In the binary case, however, $\alpha_1=\alpha_2=0$ and $F(t)$ is the differentially phase detected signal. In higher order DPM systems the equations for $H_1(t)$ and $H_2(t)$ are simultaneously solved to recover the differential phase information.

17 Claims, 2 Drawing Figures

INVENTOR
J.E. GOELL
BY A.J. Torsiglieri
ATTORNEY

NON-COHERENT DIFFERENTIAL PHASE DETECTION

BACKGROUND OF THE INVENTION

This invention relates to differentially phase modulated (DPM) communications systems and, more particularly, to methods and apparatus for the baseband differential phase detection of frequency-modulated binary differentially coherent phase-shift-keyed (FM-BDCPSK) signals without the use of a synchronous local oscillator.

The state of the art in communications systems employing frequency shift keying (FSK) is typified by U.S. Pat. Nos. 3,032,611 of G. F. Montgomery, 3,117,305 of B. Goldberg, and 3,392,337 of A. Newburger. These systems are generally characterized by the use of two different frequency signals to identify respectively the space and mark (i.e., the one and zero) of a binary encoded signal. In such a system, the signal frequency is constant throughout any particular time interval, but may vary from interval to interval, depending on the information being transmitted.

By way of contrast, this invention relates to a pulse code modulation communication system of the type disclosed in application, Ser. No. 568,893 of W. D. Warters filed on July 29, 1966 (now U.S. Pat. No. 3,492,576 issued on Jan. 27, 1970) and assigned to applicant's assignee, wherein a pulse encoded signal is used to frequency modulate a high frequency oscillator above and below a reference frequency. In a binary DPM system (FM-BDCPSK), the phase shift produced by the modulation is equal to $\pm\pi/2$ radians when integrated over one time slot. In higher order DPM systems, e.g., $n$th order, the phase shift produced for optimum noise immunity would be an integral multiple of $\pm\pi/n$.

The differential phase shift between pairs of pulses (i.e., coherent AC current pulses) in adjacent time slots is detected to recover the original binary information. Thus the signal frequency is not constant throughout any particular time interval but rather varies each and every time interval. Furthermore, in the FM-BDCPSK systems there is phase coherency among all r.f. pulses ensured by the use of a single oscillator which, as mentioned previously, is frequency modulated above or below a reference frequency. In the prior art on the other hand (e.g., Goldberg) there is no phase coherency since the two oscillators utilized are totally independent of one another. Nor is there phase coherency between successive r.f. pulses produced by the same oscillator. Consequently, all DPM systems include differential phase detectors which do not detect the frequency of the signal in each time slot (which frequency is varying continuously), as the detectors of prior art FSK systems do, but rather detect the relative phase shift between pairs of pulses in adjacent time slots, i.e., the detector output is proportional to the integral of the signal frequency taken over one time slot.

One system for the detection and equalization of carrier information signals having arbitrary modulation (including differential phase modulation) and arbitrary distortion is disclosed in my copending application, J. E. Goell Case 6, Ser. No. 882,899 filed on Dec. 8, 1969 and assigned to the assignee hereof. In that system a synchronous local oscillator, i.e., a local oscillator phase locked to the carrier, is required to drive a pair of homodynes which demodulate the carrier information signal and down-convert it to baseband.

It is a broad object of the present invention to detect a differentially phase-modulated information signal.

It is another object of this invention to detect a binary differentially coherent phase shift-keyed information signal.

It is still another object of this invention to perform such differential phase detection without the need for a synchronous local oscillator.

It is yet another object of this invention to perform such differential phase detection without the need for homodyne demodulators.

SUMMARY OF THE INVENTION

These and other objects are accomplished in an illustrative embodiment of a DPM system by decomposing the carrier information signal into its baseband conjugate in-phase and out-of-phase components, $I(t)$ and $Q(t)$, respectively, and then generating from the components the functions $$F(t) = Q(t)I(t-T) - Q(t-T)I(t) \quad (1)$$

and $$G(t) = I(t)I(t-T) + Q(t)Q(t-T) \quad (2)$$

and subsequently forming $H_1(t) = F(t)+G(t)\tan\alpha_1$, and $H_2(t) = F(t)+G(t)\tan\alpha_2$, where $T$ is the bit interval and $\alpha_1$ and $\alpha_2$ are arbitrary but generally unequal.

BRIEF DESCRIPTION OF THE DRAWING

The objects of the invention, together with its various features and advantages, can be easily understood from the following more detailed description taken in conjunction with the accompanying drawing, in which.

DETAILED DESCRIPTION

Figure 1:
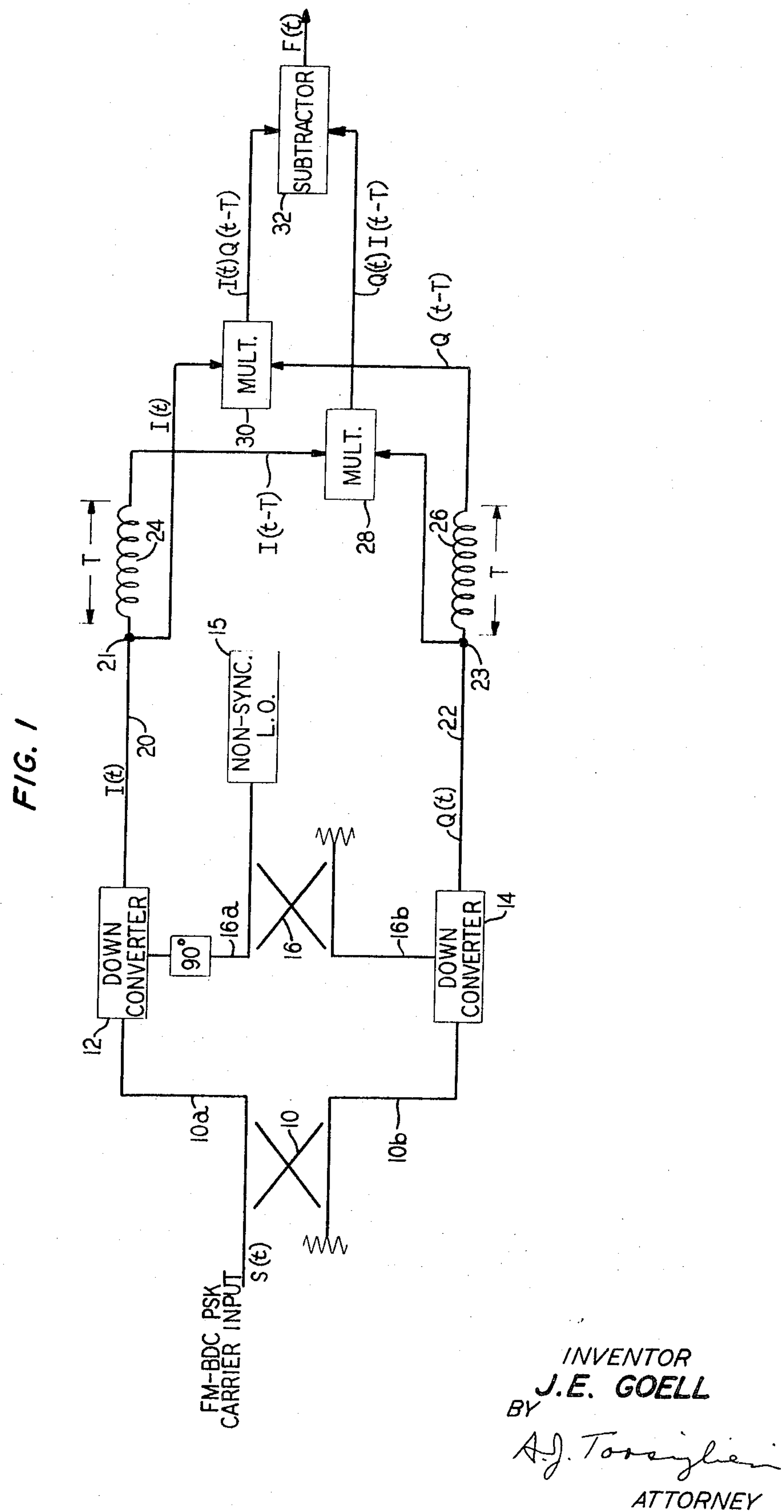
FIG. 1 is a schematic of an illustrative embodiment of the invention for detecting an FM-BDCPSK signal.

For simplicity the detection of a binary DPM signal will be described before discussing higher order DPM systems. Turning, then, to FIG. 1, an FM-BDCPSK carrier input signal $S(t)$ is applied to hybrid coupler 10 which divides the signal into equal components (in paths 10a and 10b) which are 90° out of phase with each other. These signal components are then coupled to the input of well-known down-converters 12 and 14 which are typically product demodulators. The other inputs to the down-converters are supplied by a non-synchronous local oscillator 15, the output of which is also divided by hybrid 16 into two equal components (in paths 16a and 16b) which are 90° out of phase with each other. The local oscillator component in path 16a is applied to 90° phase shifter 18 so that the inputs to the down-converters 12 and 14 from oscillator 15 are in phase with each other, thus removing the inherent phase quadrature introduced by hybrid 16.

The two inputs to each of the down-converters 12 and 14 are mixed to decompose the input signal $S(t)$ into its baseband conjugate in-phase and out-of-phase components, $I(t)$ and $Q(t)$, respectively, which appear on leads 20 and 22 as the outputs of down-converters 12 and 14, respectively. These functions are given by $$I(t) = V(t)\cos[\Phi(t) + \delta(t)] \quad (3)$$

and $$Q(t) = V(t)\sin[\Phi(t) + \delta(t)] \quad (4)$$

where $V(t)$ is the amplitude of the input signal $S(t)$, typically a constant in a DPM system, $\Phi(t)$ is the phase of $S(t)$ and $\delta(t)$ is the difference between the phase of the undeviated carrier of the input signal and that of the local oscillator.

The in-phase component $I(t)$ is then divided at junction 21 into two signals one of which is time delayed by delay line 24 by an amount $T$ to produce $I(t-T)$. Similarly the out-of-phase component $Q(t)$ is divided at junction 23 into two signals one of which is time delayed by delay line 26 also by an amount $T$ to produce $Q(t-T)$. Both $I(t-T)$ and $Q(t)$ are then applied to a conventional multiplier 28 (e.g., a diode multiplier) to produce the product signal $Q(t)I(t-T)$. In the same manner multiplier 30 generates $I(t)Q(t-T)$ from the undelayed portion of $I(t)$ and the delayed portion of $Q(t)$. These product outputs of multipliers 28 and 30 are then subtracted in subtractor 32 (e.g., the sum of the outputs of conventional amplifiers, one with 180° phase inversion) to generate $F(t)$ the differentially phase detected signal given by equation (1).

That the function $F(t)$ given by equation (1) does indeed produce differential phase detection can be seen by substituting equations (3) and (4) into equation (1) to yield $$F(t) = V(t)\sin[\Phi(t)+\delta(t)]\cdot V(t-T)\cos[\Phi(t-T)+\delta(t-T)] - V(t)\cos[\Phi(t)+\delta(t)]\cdot V(t-T)\sin[\Phi(t-T)+\delta(t-T)] \quad (5)$$

which can readily be mathematically reduced to $$F(t)=V(t)V(t-T)\sin[\Phi(t)-\Phi(t-T)+\delta(t)-\delta(t-T)] \quad (6)$$

If the local oscillator 15 obeys the rather mild stability requirement that $$\delta(t)-\delta(t-T)<<\pi/2, \quad (7)$$

then $$F(T)\approx V(t)V(t-T)\sin[\Phi(t)-\Phi(t-T)] \quad (8)$$

which is the differentially phase detected signal, where the phase difference $\Phi(t)-\Phi(t-T)$ is an integral multiple of $\pm\pi/n$ for an $n$th order DPM system and $\pm\pi/2$ for an FM-BDCPSK system.

In such a higher order DPM system the signal is detected in accordance with an illustrative embodiment of the invention shown in FIG. 2, again, without the need for a synchronous local oscillator. The detector of FIG. 2 incorporates completely the binary detector of FIG. 1 for generating $F(t)$ given by equation (1). Consequently, the numerals used in FIG. 1 are identical to those of FIG. 1 for all common equipment.

Figure 2:
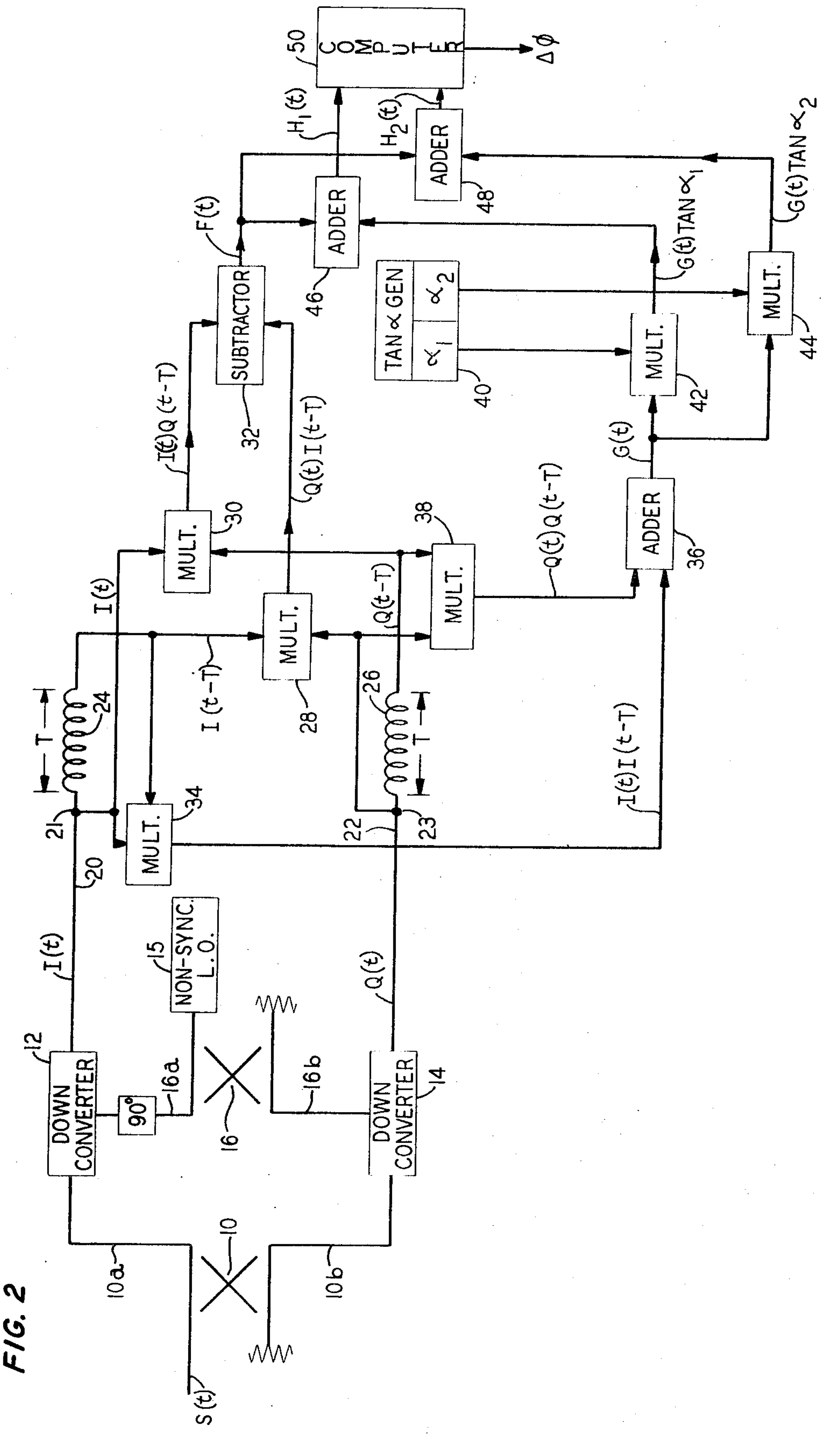
FIG. 2 is a schematic of an illustrative embodiment of the invention for detecting an $n$th order DPM signal.

The detector of FIG. 2, however, includes additional equipment for generating the function $G(t)$ given by equation (2), which when combined with equations (3) and (4) for $I(t)$ and $Q(t)$, yields $$G(t)=V(t)V(t-T)\cos[\phi(t)-\phi(t-T)] \quad (9)$$

It can readily be seen, therefore, that since $G(t)$ and $F(t)$ are quadrature functions, they contain all the information of an $n$th order DPM signal. The manner of extracting this information will be described hereinafter. First, however, the generation of $G(t)$ will be discussed. The output $I(t)$ of down-converter 12 and the output $I(t-T)$ of delay line 24 are multiplied in multiplier 34 to produce the product $I(t)I(T-T)$ which is applied to one input of adder 36. Similarly, the output $Q(t)$ of down-converter 14 and the output $Q(t-T)$ of delay line 26 are multiplied in multiplier 38 to generate the product signal $Q(t)Q(t-T)$ which is applied to the other input of adder 36, the output of the adder being $G(t)$.

The next step in the process involves generating by well-known means 40 two attenuation factors tan $\alpha_1$ and tan $\alpha_2$, where $\alpha_1$ and $\alpha_2$ are arbitrary but generally nonzero and unequal. Note, however, that only for a purely binary DPM signal are $\alpha_1$ and $\alpha_2$ equal and more particularly $\alpha_1=\alpha_2=0$. Each of these factors is multiplied by $G(t)$ in separate multipliers 42 and 44 (which may more simply be just attenuators) to generate respectively, $G(t)\tan\alpha_1$, and $G(t)\tan\alpha_2$, which are then added to $F(t)$ by means for separate adders 46 and 48 to generate the functions $$H_1(t)=F(t)+G(t)\tan\alpha_1 \quad (10)$$

and $$H_2(t)=F(t)+G(t)\tan\alpha_2 \quad (11)$$

These signals, when combined with equations (8) and (9) for $F(t)$ and $G(t)$, respectively, reduce to $$H_1(t)=V(t)V(t-T)\sin[\phi(t)-\phi(t-T)+\alpha_1] \quad (12)$$

and $$H_2(t)=F(t)V(t-T)\cos[\phi(t)-\phi(t-T)+\alpha_2] \quad (13)$$

when normalized by the factor $\sqrt{1+\tan^2 a}$.

It is the differential phase $\Delta\phi=\phi(t)-\phi(t-T)$ which it is desired to detect. Since, however, the sine and cosine functions are multivalued, it is necessary in higher order DPM systems to generate two distinct functions $H(t)$ by means of separate alphas. The differential phase information contained in $\Delta\phi$ may be recovered by solving the simultaneous equations (12) and (13) and picking the coincident set. This procedure is well known in the art and is shown generally to be performed by computer 50.

Illustratively, a limiter (not shown) can be utilized to ensure that $V(t)=V(t-T)=$ a constant, especially where spurious amplitude modulation has been added to the signal. With $\alpha_1$ and $\alpha_2$ known, only $\Delta\phi$ remains unknown in each equation. In a quaternary system, for example, $\Delta\phi$ can take on the values $\pm\pi/4$ and $\pm3\pi/4$. Each equation is solved, i.e., $$\Delta\varphi=\sin^{-1}\left[\frac{H_{1(t)}}{V(t)V(t-T)}\right]-\alpha_1 \quad (14)$$

$$\Delta\varphi=\sin^{-1}\left[\frac{H_{2(t)}}{V(t)V(t-T)}\right]-\alpha_2 \quad (15)$$

In such a quaternary system the multivalued equation (14) might yield $\Delta\phi=\pi/4$, $3\pi/4$ as solutions, whereas equation (15) might yield $\Delta\phi=\pi/4, -3\pi/4$. The coincident set, $\pi/4$, is therefore the actual differential phase shift $\Delta\phi$.

In addition to the above technique for deriving $\Delta\phi$, it should be noted that for a quaternary system specifically, the functions $H_1(t)$ and $H_2(t)$ correspond to the signals $V_1$ and $V_2$ generated in the quaternary detectors disclosed in my copending application, J. E. Goell Case 3, Ser. No. 659,203 filed on Aug. 8, 1967 (now U.S. Pat. No. 3,519,936 issued on July 7, 1970) and the copending application of W. M. Hubbard Case 5, Ser. No. 659,209 also filed on Aug. 8, 1967 (now U.S. Pat. No. 3,519,937 issued on July 7, 1970), both of which are assigned to the assignee hereof. Each of these applications teaches different means for recovering the phase information from the signals $V_1$ and $V_2$ and hence from $H_1(t)$ and $H_2(t)$.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, where the transmission medium has introduced distortion into the information signal (e.g., quadratic waveguide phase distortion), it is readily possible to equalize the signal, for example, at carrier frequencies (i.e., prior to down-converters 12 and 14) by means of a carrier transversal equalizer of the type described in my copending application, J. E. Goell 5, Ser. No. 868,034, filed on Oct. 21, 1969, and assigned to the assignee hereof. Alternatively, equalization may be performed at baseband (i.e., after down-converters 12 and 14) by means of a baseband transversal equalizer of the type disclosed in my copending application, J. E. Goell Case 6, Ser. No. 882,899, filed on Dec. 8, 1969 and assigned to the assignee hereof.

What is claimed is:

1. A method for the detection of a differentially phase modulated carrier information signal comprising the steps of:

decomposing said signal into its conjugate baseband in-phase and out-of-phase components, $I(t)$ and $Q(t)$, respectively, and first generating from these components the functions $F(t)$ and $G(t)$ given by $Q(t)I(t-T)-I(t)Q(t-T)$ and $Q(t)Q(t-T)+I(t)I(t-T)$, respectively, where $T$ is the bit interval of said information signal, secondly generating from $F(t)$ and $G(t)$ the signals $H_1(t)$ and $H_2(t)$ given by $F(t)+G(t)\tan\alpha_1$ and $F(t)+G(t)\tan\alpha_2$, respectively, where $\alpha_1$ and $\alpha_2$ are arbitrary but generally unequal, and solving simultaneously $H_1(t)$ and $H_2(t)$ to recover the differential phase information.

2. The method of claim 1 wherein said decomposing step comprises the steps of:

dividing said signal into two signal portions, phase shifting by 90° one of said signal portions, mixing both said phase shifted signal portion and said other portion with a non-synchronous local oscillator signal to generate at baseband $Q(t)$ from said phase shifted signal portion and $I(t)$ from said other portion.

3. The method of claim 2 for use in an $n$th order system, including the additional step of maintaining the phase difference $\delta(t)$ between the phase of the undeviated carrier of said information signal and the phase of said local oscillator such that $\delta(t)\alpha\%\delta(t-T)<<\pi/n$.

4. The method of claim 3 for use in a binary differentially coherent phase shift-keyed system and wherein $n$ is equal to 2.

5. The method of claim 1 wherein said first generating step comprises the steps of:

dividing $I(t)$ and $Q(t)$ into two separate signal portions, time delaying one of each of said signal portions of $I(t)$ and $Q(t)$ by an amount $T$, multiplying the undelayed portion of $I(t)$ with the delayed portion of $Q(t)$ to generate a first signal product, multiplying the undelayed portion of $Q(t)$ with the delayed portion of $I(t)$ to generate a second signal product, subtracting said first signal product from said second signal product, thereby to produce the signal $F(t)$.

6. The method of claim 5 wherein said information signal is a frequency modulated binary differentially coherent phase shift-keyed signal, $\alpha_1=\alpha_2=0$, and $F(t)$ is the differentially phase-detected version of said signal.

7. The method of claim 5 including the additional steps of multiplying $I(t)$ and its time-delayed portion together to produce a third signal product, multiplying $Q(t)$ and its time-delayed portion together to produce a fourth signal product, adding said third and fourth signal products to produce $G(t)$, generating tan $\alpha_1$ and tan $\alpha_2$, multiplying each of tan $\alpha_1$ and tan $\alpha_2$ by $G(t)$ to produce $G(t)$ tan $\alpha_1$ and $G(t)$ tan $\alpha_2$, adding $F(t)$ to each of $G(t)$ tan $\alpha_1$ and $g(t)$tan $\alpha_2$ to produce $H_1(t$ and $H_2(t)$.

8. A differential phase detector comprising means for decomposing a differentially phase modulated carrier information signal into its conjugate baseband in-phase and out-of-phase components, $I(t)$ and $Q(t)$, respectively, and first means for generating from these components the functions $F(t)$ and $G(t)$ given by $Q(t)I(t-T)-I(t)Q(t-T)$ and $Q(t)Q(t-T)+I(t)I(t-T)$, respectively, where $T$ is the bit interval of said information signal, means for generating tan $\alpha_1$ and tan $\alpha_2$, where $\alpha_1$ and $\alpha_2$ are arbitrary and generally unequal, second means for generating the functions $H_1(t)$ and $H_2(t)$ given by $F(t) + G(t)$tan $\alpha_1$ and $F(t) + G(t)$tan $\alpha_2$, respectively, and means for simultaneously solving $H_1(t)$ and $H_2(t)$ to recover the differential phase information.

9. The detector of claim 8 wherein said decomposing means comprises means for dividing said signal into two separate portions, means for phase shifting by 90° one of said portions, first and second down-converters, a non-synchronous local oscillator which generates a signal of phase which differs from the phase of said carrier information signal by an amount $\delta(t)$, means for coupling said phase-shifted portion of said information signal and a portion of said local oscillator signal into said first down-converter to generate $I(t)$ at its output, and means for coupling said other signal portion and a portion of said local oscillator signal into said second down-converter to generate $Q(t)$ at its output.

10. The detector of claim 9 wherein said dividing means and said phase shifting means comprise a resistively terminated hybrid coupler.

11. The detector of claim 9 for use in an $n$th order differentially phase-modulated system, in combination with means for maintaining said phase difference $\delta(t)$ such that $\delta(t)\alpha⅛\delta(t-T)<<\pi/n$.

12. The detector of claim 11 wherein said system is a binary differentially coherent phase shift-keyed system and $n=2$.

13. The detector of claim 8 wherein said generating means comprises means for dividing both $I(t)$ and $Q(t)$ into two separate signal portions, means for time delaying by an amount $T$ one portion of each of $I(t)$ and $Q(t)$, means for multiplying the undelayed portion of $I(t)$ and the delayed portion for $Q(t)$ to generate a first product signal, means for multiplying the undelayed portion of $Q(t)$ and the delayed portion of $I(t)$ to generate a second product signal, and means for subtracting said first signal product from said second product signal, thereby to produce the signal $F(t)$.

14. The detector of claim 13 wherein said time delaying means comprises a delay line of length adapted to produce a delay of $T$ seconds.

15. The detector of claim 13 wherein said each of multiplying means comprise a diode multiplier.

16. The detector of claim 13 for use in a frequency modulated binary differentially coherent phase shift-keyed system wherein $\alpha_1=\alpha_2=0$ and $F(t)$ is the differentially phase detected version of said signal.

17. The detector of claim 13 wherein said first means for generating $G(t)$ comprises means for multiplying the delayed and undelayed portions of $Q(t)$ together to produce a third signal product, means for multiplying the delayed and undelayed portions of $I(t)$ together to produce a fourth signal product, means for adding said third and fourth signal products together to generate $G(t)$, means for multiplying $G(t)$ by tan $\alpha_1$ and tan $\alpha_2$ to generate $G(t)$ tan $\alpha_1$ and $G(t)$ tan $\alpha_2$, means for adding $F(t)$ to each of $G(t)$ tan $\alpha_1$ and $G(t)$ tan $\alpha_2$ to produce $H_1(t)$ and $H_2(t)$, respectively, and means for simultaneous solving the equations for $H_1(t)$ and $H_2(t$ to recover the differential phase information.

* * * * *